(12) United States Patent
Aida et al.

(10) Patent No.: US 7,462,396 B2
(45) Date of Patent: Dec. 9, 2008

(54) MULTILAYER LAMINATE OF FLUORORESIN

(75) Inventors: Shigeru Aida, Tokyo (JP); Toshiyuki Chisaka, Tokyo (JP); Atsushi Funaki, Tokyo (JP); Hiroki Kamiya, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 11/955,979

(22) Filed: Dec. 13, 2007

(65) Prior Publication Data

US 2008/0102285 A1    May 1, 2008

Related U.S. Application Data

(63) Continuation of application No. PCT/JP2006/310583, filed on May 26, 2006.

(30) Foreign Application Priority Data

Jun. 14, 2005   (JP)   ............... 2005-173223

(51) Int. Cl.
    B32B 27/08   (2006.01)
    B32B 27/28   (2006.01)
    B32B 27/32   (2006.01)
    B32B 27/36   (2006.01)
    B32B 27/40   (2006.01)

(52) U.S. Cl. ............. 428/421; 428/423.1; 428/480; 428/500; 428/522; 428/523

(58) Field of Classification Search .......... None
    See application file for complete search history.

(56) References Cited

U.S. PATENT DOCUMENTS

| | | | |
|---|---|---|---|
| 5,570,711 A | 11/1996 | Walsh | |
| 6,197,904 B1 * | 3/2001 | Gangal et al. | ............... 526/247 |
| 6,656,553 B2 | 12/2003 | Nishi et al. | |
| 6,703,465 B2 | 3/2004 | Funaki et al. | |
| 6,753,087 B2 | 6/2004 | Jing et al. | |
| 6,855,787 B2 | 2/2005 | Funaki et al. | |
| 7,078,470 B2 | 7/2006 | Funaki et al. | |
| 7,112,640 B2 | 9/2006 | Funaki et al. | |
| 7,205,367 B2 | 4/2007 | Funaki et al. | |
| 7,273,645 B2 | 9/2007 | Funaki et al. | |
| 2002/0119319 A1 | 8/2002 | Funaki et al. | |
| 2004/0040608 A1 | 3/2004 | Ito et al. | |
| 2004/0191440 A1 * | 9/2004 | Funaki et al. | ............... 428/34.6 |
| 2006/0233992 A1 | 10/2006 | Funaki et al. | |
| 2007/0036927 A1 | 2/2007 | Funaki et al. | |
| 2007/0056681 A1 | 3/2007 | Aida et al. | |
| 2007/0148389 A1 | 6/2007 | Nishioka et al. | |

FOREIGN PATENT DOCUMENTS

| | | |
|---|---|---|
| JP | 61-164730 | 10/1986 |
| JP | 6-9917 | 11/1986 |
| JP | 3-7590 U | 1/1991 |
| JP | 9-509626 | 9/1997 |
| JP | 10-286897 | 10/1998 |
| JP | 10311461 A * | 11/1998 |
| JP | 11-151768 | 6/1999 |
| JP | 2000-516871 | 12/2000 |
| JP | 2002-327018 | 11/2002 |
| JP | 2002-357285 | 12/2002 |
| JP | 3428026 | 5/2003 |
| JP | 2003-176394 | 6/2003 |
| JP | 2004-90405 | 3/2004 |
| JP | 2004-238405 | 8/2004 |
| JP | 2004-301247 | 10/2004 |
| JP | 3609866 | 10/2004 |
| JP | 2004-536722 | 12/2004 |
| WO | WO 99/45044 | 9/1999 |
| WO | WO 01/18142 | 3/2001 |

OTHER PUBLICATIONS

English language translation of JP 10-311,461, Nov. 1998.*
U.S. Appl. No. 11/955,979, filed Dec. 13, 2007, Aida et al.

* cited by examiner

*Primary Examiner*—Ramsey Zacharia
(74) *Attorney, Agent, or Firm*—Oblon, Spivak, McClelland, Maier & Neustadt, P.C.

(57) ABSTRACT

A multilayer laminate containing a laminate (I)/(II) that is formed by directly bonding a layer (I) made of a fluororesin (A) having a functional group (a), said fluororesin (A) being an ethylene/tetrafluoroethylene/hexafluoropropylene/$CH_2=CH-Rf$, wherein Rf copolymer is a $C_{2-6}$ perfluoroalkyl group, and in the copolymer, the molar ratio of repeating units based on ethylene/repeating units based on tetrafluoroethylene/repeating units based on hexafluoropropylene/repeating units based on $CH_2=CH-Rf$ ranges from 40/47/10/3 to 46.9/46.9/6/0.2 and a layer (II) made of a thermoplastic resin (B) having a functional group (b) that is capable of forming a chemical bond by reacting with the functional group (a) of the fluororesin, wherein the fluororesin (A) has a melting point ranging from 120 to 230° C.

13 Claims, No Drawings

MULTILAYER LAMINATE OF FLUORORESIN

TECHNICAL FIELD

The present invention relates to a multilayer laminate of a fluororesin, and more particularly, it relates to a multilayer laminate of a fluororesin excellent in interlayer adhesion.

BACKGROUND ART

A fluorocopolymer (hereinafter referred to simply as "fluororesin") such as polytetrafluoroethylene, a tetrafluoroethylene/perfluoro(alkyl vinyl ether) copolymer or an ethylene/tetrafluoroethylene copolymer, has characteristics excellent in e.g. heat resistance, chemical resistance, water resistance, oil resistance, weather resistance, aging resistance, gas barrier properties, fuel barrier properties, release properties, non-stickiness, antifouling properties, dye adhesion resistance and unelution properties, and such a fluororesin is employed in various fields such as semiconductor industries, aircraft or automobile industries, food manufacturing industries and medical industries. The fluororesin has the above characteristics, and thus is basically preferably used for transportation tubes for e.g. pure water, ultrapure water, drinking water, alcoholic beverages such as beers, nonalcoholic beverages such as juices, pharmaceuticals, blood, transfusion or chemicals.

Accordingly, in the case of employing such a fluororesin for the above application, it has been attempted to make it into a laminate with e.g. other general-purpose resin materials in order to compensate the high cost and lack in mechanical strength such as abrasion resistance, toughness or flexibility which is further required to be provided. However, a fluororesin is basically poor in adhesion to other materials, and therefore, it was difficult to make it into a strong laminate. For example, similarly to a case where the fluororesin is bonded to e.g. a metal, a metal oxide, glass or ceramics, also in a case where it is bonded to other resin materials, e.g. a method has been employed in which the surface of the fluororesin is subjected to corona discharge treatment, sodium etching treatment or the like, and then an adhesive is applied on the surface for bonding. Such a bonding method is cumbersome in process steps, low in productivity and high in cost of products. Further, in a method of etching a fluororesin tube by sodium to improve interlayer adhesion, the tube tends to be discolored, and therefore, there is such a problem that it is impossible to use the tube for the application where the transparency is required. Accordingly, it is desired to develop a fluororesin which can be bonded to other resin materials by a simpler method which replaces the above method.

Heretofore, from such a viewpoint, a method for producing a tube excellent in mechanical properties and fuel barrier properties at a low cost has been known, in which co-extrusion is carried out to laminate a polyamide and an ethylene/tetrafluoroethylene copolymer having an adhesive functional group such as an acid anhydride residue of itaconic acid or citraconic acid introduced. Such a tube has been utilized as a fuel tube for automobiles (see Patent Document 1).

It is disclosed in Patent Document 2 that, in order to improve the bonding strength of a tube obtained by laminating an outer layer of a polyurethane superior in flexibility to a polyamide and an inner layer made of a fluororesin such as an ethylene/tetrafluoroethylene copolymer, an inorganic filler is blended to the fluororesin and further a silane coupling agent is blended to the polyurethane so as to bond the filler to the silane coupling agent. However, by such a technique, the adhesion between the polyurethane and the fluororesin was still insufficient.

On the other hand, there has been a problem that the molding process temperature of a fluororesin is high at the time of laminating the fluororesin with other resin materials. Namely, the molding temperature of a usual fluororesin is usually from about 280 to 350° C., and most of thermoplastic resins cannot withstand such a high temperature molding condition. Further, as a fluororesin which is moldable even at a low temperature of at most 250° C., preferably less than 250° C., e.g. an ethylene/tetrafluoroethylene/hexafluoropropylene copolymer has been known (see Patent Document 3 and Patent Document 4).

Patent Document 5 discloses a method of bonding an ethylene/tetrafluoroethylene/hexafluoropropylene copolymer and a thermoplastic resin such as polyamide, polyurethane, an acid-modified ethylene/vinyl acetate copolymer or an ethylene/methyl acrylate copolymer by means of thermal lamination at a temperature of from 250 to 300° C. Further, Patent Document 6 discloses treatment of the surface of a fluororesin with an adhesive composition (primer) made of an amino-substituted organic silane which may contain a phase transfer catalyst, to improve the bonding properties with polyurethane or polyamide. It is disclosed that a fluororesin and a thermoplastic resin are bonded by such techniques, whereby it is possible to obtain e.g. a laminate tube having both the flexibility of the thermoplastic resin and the chemical resistance of the fluororesin. However, the above laminating methods take a considerable time for bonding, require process steps of applying and treating a primer made of an adhesive composition, have a problem that productivity is poor due to complex process steps, and are insufficient even in the bonding strength.

Further, Patent document 7 and Patent Document 8 disclose a method of laminating substrates of an ethylene/tetrafluoroethylene/hexafluoropropylene adhesive copolymer having a specific amount of a carbonate group and/or a carboxylic halide group introduced as an adhesive functional group, and e.g. a polyamide, an ethylene/vinyl alcohol copolymer or a modified-polyethylene. However, in such a method, it was difficult to increase the amount of the adhesive functional group to be introduced, and further, there was a problem that the adhesion durability of the laminate was not necessarily sufficient.

Patent Document 1: JP-A-2004-238405
Patent Document 2: JP-B-6-9917
Patent Document 3: Japanese Patent No. 3609866
Patent Document 4: Japanese Patent No. 3428026
Patent Document 5: JP-A-2000-516871
Patent Document 6: JP-A-2004-536722
Patent Document 7: WO 99/45044
Patent Document 8: WO 01/18142

DISCLOSURE OF THE INVENTION

Object to be Accomplished by the Invention

It is an object of the present invention to provide a multiplayer laminate of a fluororesin and a thermoplastic resin excellent in interlayer adhesion and productivity, which has been desired to be developed based on the background as mentioned above.

Means to Accomplish the Object

The present invention is directed to a laminate having the following construction to accomplish the above object.

(1) A multilayer laminate containing a laminate (I)/(II) formed by directly bonding a layer (I) made of a fluororesin (A) with a functional group (a) and a layer (II) made of a thermoplastic resin (B) with a functional group (b) capable of forming a chemical bond by reacting with the functional group (a) of the fluororesin, wherein the fluororesin (A) has a low melting point of from 120 to 230° C.

(2) The multilayer laminate according to (1), wherein the functional group (a) of the fluororesin (A) is an acid anhydride residue.

(3) The multilayer laminate according to (1) or (2), wherein the fluororesin (A) is at least one fluororesin selected from the group consisting of an ethylene/tetrafluoroethylene copolymer, an ethylene/tetrafluoroethylene/hexafluoropropylene copolymer and an ethylene/tetrafluoroethylene/hexafluoropropylene/$CH_2$=CH—Rf (Rf is a $C_{2-6}$ perfluoroalkyl group) copolymer.

(4) The multilayer laminate according to any one of (1) to (3), wherein the fluororesin (A) is an ethylene/tetrafluoroethylene/hexafluoropropylene/$CH_2$=CH—Rf (Rf is a $C_{2-6}$ perfluoroalkyl group) copolymer, and in the copolymer, the molar ratio of repeating units based on ethylene/repeating units based on tetrafluoroethylene/repeating units based on hexafluoropropylene/repeating units based on $CH_2$=CH—Rf is from 40/47/10/3 to 46.9/46.9/6/0.2.

(5) The multilayer laminate according to any one of (1) to (4), wherein the functional group (b) of the thermoplastic resin (B) is an amino group.

(6) The multilayer laminate according to any one of (1) to (5), wherein the thermoplastic resin (B) is at least one thermoplastic resin or elastomer selected from the group consisting of polyurethane, polyester, polyolefin, polyvinyl acetate, polyvinyl chloride and polystyrene thermoplastic resins.

(7) The multilayer laminate according to any one of (1) to (6), wherein the thermoplastic resin (B) has a Shore A hardness of at most 85.

(8) The multilayer laminate according to any one of (1) to (7), wherein the fluororesin (A) has an MIT flex number of 20,000 to 100,000 as measured by ASTM D-2176.

(9) The multilayer laminate according to any one of (1) to (8), wherein the fluororesin (A) has a tensile strength of from 35 to 60 MPa as measured by ASTM D-3159.

(10). The multilayer laminate according to any one of (1) to (9), wherein the above multilayer laminate is bonded under heating by multilayer extrusion, by multilayer injection molding or by multilayer laminate molding.

(11) The multilayer laminate according to any one of (1) to (10), which is one bonded under heating at a temperature of from 150 to 300° C.

(12) The multilayer laminate according to any one of (1) to (11), wherein the interlayer adhesion between the layer (I) made of the fluororesin (A) and the layer (II) made of the thermoplastic resin (B), is from 5 to 30 N/cm.

EFFECTS OF THE INVENTION

According to the present invention, it is possible to provide a multilayer fluororesin laminate which is excellent in interlayer adhesion and can be produced at low-cost while maintaining chemical resistance, flexibility, transparency and mechanical strength as characteristics of a fluororesin.

Further, more particularly, the multilayer laminate of the present invention is a laminate excellent in the adhesion, which is formed by directly bonding and laminating a fluororesin layer with a specific functional group and a thermoplastic resin layer with a functional group reactive with the above functional group, at a temperature at which e.g. the thermoplastic resin is not decomposed, and the laminate can be readily formed into various shapes such as a film, a sheet, a tube, a hose and a tank.

Furthermore, regarding the multilayer laminate of the present invention, in a case where as the thermoplastic resin to be laminated on the fluororesin, a desired flexible resin or elastomer is particularly selected, the layer is flexible without peeling or breaking, and therefore, the multilayer laminate can suitably be used in the fields of e.g. industrial tubes, medical tubes and industrial belts in which flexibility is required.

BEST MODE FOR CARRYING OUT THE INVENTION

Now, the present invention will be described in detail.

The multilayer laminate of the present invention is a multilayer laminate containing a laminate (I)/(II) formed by directly bonding a layer (I) made of a fluororesin (A) with a functional group (a) and a layer (II) made of a thermoplastic resin (B) with a functional group (b) capable of forming a chemical bond by reacting with the functional group (a) of the fluororesin.

Fluororesin with Functional Group

The fluororesin (A) with the functional group (a) of the present invention is a fluororesin (A) containing at least one functional group (a) selected from the group consisting of an acid anhydride residue, a carboxyl group, a hydroxyl group, an ethoxy group, a hydrolyzable silyl group, an alkoxy carbonyl group and an acid halide group.

The fluororesin (A) in the present invention is not particularly limited so long as it is a fluororesin containing the above functional group (a). For example, it is preferably a tetrafluoroethylene/perfluoro(alkyl vinyl ether) copolymer, a tetrafluoroethylene/hexafluoropropylene copolymer, a tetrafluoroethylene/perfluoro(alkyl vinyl ether)/hexafluoropropylene copolymer, an ethylene/tetrafluoroethylene copolymer, an ethylene/chlorofluoroethylene copolymer or an ethylene/tetrafluoroethylene/hexafluoropropylene copolymer, more preferably an ethylene/tetrafluoroethylene copolymer or an ethylene/tetrafluoroethylene/hexafluoropropylene copolymer. Hereinafter, ethylene may be referred to as "E", tetrafluoroethylene "TFE", and hexafluoropropylene "HFP".

Further, in order to improve the stress crack resistance or keep the productivity of the fluororesin stably, it is preferred that a comonomer of $CH_2$=CH—Rf (Rf is a $C_{2-6}$ perfluoroalkyl group) is copolymerized with an E/TFE/HFP copolymer. Here, the carbon number of Rf in the $CH_2$=CH—Rf is most preferably 4.

The fluororesin (A) in the present invention is particularly preferably at least one fluororesin selected from the group consisting of an E/TFE copolymer, an E/TFE/HFP copolymer and an E/TFE/HFP/$CH_2$=CH—Rf (Rf is a $C_{2-6}$ perfluoroalkyl group) copolymer.

In the above E/TFE copolymer, the molar ratio of repeating units based on E/repeating units based on TFE is preferably from 46/54 to 50/50, more preferably from 47/53 to 49/51. If the molar ratio of repeating units based on E/repeating units based on TFE is less than 46/54, the mechanical strength will be lowered, and if it is more than 50/50, the heat resistance will be lowered. When the molar ratio is within such a range, the mechanical strength will be excellent and the heat resistance will be also excellent.

In the above E/TFE/HFP copolymer, the molar ratio of (repeating units based on E+ repeating units based on TFE)/repeating units based on HFP, is preferably from 90/10 to 94/6, more preferably from 91/9 to 93/7. If the molar ratio is less than 90/10, the polymerization will be difficult, and at the same time, the heat resistance will be lowered. If the molar ratio is more than 94/6, the melting point will be high, whereby the moldability will be deteriorated. When the molar ratio is within such a range, the productivity (polymerization) and the heat resistance will be excellent, and the moldability will be also excellent.

In the above E/TFE/HFP/CH$_2$=CH—Rf copolymer, the molar ratio of (repeating units based on E+ repeating units based on TFE+ repeating units based on HFP)/repeating units based on CH$_2$=CH—Rf, is preferably from 97/3 to 99.8/0.2, more preferably from 98/2 to 99.6/0.4. If the molar ratio is less than 97/3, the productivity and the heat resistance will be deteriorated, and if the molar ratio is more than 99.8/0.2, the flexing resistance (MIT) will be deteriorated. When the molar ratio is within such a range, the productivity and the heat resistance will be excellent, and the flexing resistance will be also excellent.

As a preferred copolymerization composition, the repeating units based on E/repeating units based on TFE/repeating units based on HFP/repeating units based on CH$_2$=CH—Rf is from 40/47/10/3 to 46.9/46.9/6/0.2 (molar ratio), more preferably from 42/47/9/2 to 46/47/6.5/0.5 (molar ratio). When the molar ratio is within such a range, the productivity and heat resistance will be excellent, and the flexing resistance will be most excellent.

The volume flow rate (hereinafter referred to as "value Q") of the fluororesin (A) in the present invention is from 0.1 to 1,000 mm$^3$/sec, preferably from 1 to 500 mm$^3$/sec, more preferably from 2 to 200 mm$^3$/sec. The value Q is an index which represents the melt flowability of the resin which becomes critical when the fluororesin is subjected to melt molding, and the value Q may be used as an index for the molecular weight. Namely, it shows that the molecular weight is low when the value Q is high, and the molecular weight is high when the value Q is low. The value Q in the present invention is the extrusion rate of a resin at the time of extruding into an orifice having a diameter of 2.1 mm and a length of 8 mm under a load of 7 kg at a temperature higher by 50° C. than the melting point of fluororesin, by using a Fluorotester manufactured by Shimadzu Corporation. If the value Q is too small, the extrusion of the fluororesin will be difficult, and if it is too large, the mechanical strength of the resin will be deteriorated.

Further, the fluororesin (A) in the present invention is selected so as to have a low melting point of from 120 to 230° C., preferably from 140 to 200° C. By selecting a fluororesin having a melting point within is such a range, in a case where the laminate is to be formed by laminating and bonding the fluororesin with a thermoplastic resin under heating by means of e.g. melt molding or heat pressing, no thermal decomposition or the like of the thermoplastic resin is accompanied, and a strong chemical bond is formed by sufficiently reacting a functional group (a) of the fluororesin with a functional group (b) of the thermoplastic resin, whereby it is possible to obtain a laminate bonded by strong adhesion.

An MIT flex number of the fluororesin in the present invention is preferably from 20,000 to 100,000, more preferably from 30,000 to 80,000. The MIT flex number is measured in accordance with ASTM D-2176, and when such a value is high, the material is unlikely to break even when the fluororesin is bended repeatedly, which shows that the stress crack resistance is excellent.

The tensile strength of the fluororesin (A) in the present invention is preferably from 35 to 60 MPa, more preferably from 40 to 55 MPa. When the tensile strength is within such a range, it will be required to apply higher stress to break a molded product such as a tube or a film obtainable, and thus, it is possible to obtain a molded product having high strength.

Introducing of Functional Group (a)

In the present invention, the method for introducing at least one functional group (a) selected from the group consisting of an acid anhydride residue, a carboxyl group, a hydroxyl group, an epoxy group, a hydrolyzable silyl group, an alkoxy carbonyl group and an acid halide group to the above fluororesin, may, for example, be a method of copolymerizing a fluoromonomer and a comonomer with a functional group (a) at the time of producing a fluororesin by polymerizing a fluoromonomer such as TFE or HFP; a method of polymerizing a fluoromonomer in the presence of a polymerization initiator or a chain transfer agent with a functional group (a) so as to introduce the functional group (a) to the polymer terminals; a method of kneading a comonomer with a functional group (a) and a fluororesin, followed by irradiation with radiation; and a method of kneading a comonomer with a functional group (a), a fluororesin and a radical initiator, followed by melt molding to polymerize the comonomer having the functional group (a) with the fluororesin by graft polymerization. Among them, it is preferred to employ a method of copolymerizing a fluoromonomer and a comonomer having a functional group (a) such as a monomer having an unsaturated bond and a cyclic acid anhydride such as itaconic anhydride or citraconic anhydride, as disclosed in JP-A-2004-238405. The comonomer having a functional group (a) is preferably itaconic anhydride or citraconic anhydride, more preferably itaconic anhydride.

The content of the functional group (a) in the fluororesin (A) is preferably from 0.01 to 10 mol % ((molar amount of functional group (a)/molar amount of the entire repeating units of polymer)×100%, the same applies hereinafter), more preferably from 0.05 to 5 mol %, most preferably from 0.1 to 3 mol %. If the amount of the functional group is less than 0.01 mol %, it is impossible to obtain the effect of the present invention, and if it is more than 10 mol %, the physical property itself of the fluororesin is likely to be deteriorated, such being undesirable.

The method for producing the fluororesin (A) in the present invention is not particularly limited, and it is possible to apply a method comprising introducing a fluoromonomer such as TFE or HFP, a nonfluoromonomer such as E, an acid anhydride monomer such as itaconic anhydride, to a reactor, followed by copolymerizing them by using a radical polymerization initiator and a chain transfer agent which are usually used. The polymerization method may, for example, be bulk polymerization; solution polymerization using an organic solvent such as a fluorohydrocarbon, a chlorohydrocarbon, a fluorochlorohydrocarbon, an alcohol or a hydrocarbon as a polymerization medium; suspension polymerization using an aqueous medium, and if necessary, a suitable organic solvent, as polymerization media; or emulsion polymerization using an aqueous medium and an emulsifier as polymerization media known per se, and solution polymerization is most preferred. The polymerization may be carried out by a batch operation or a continuous operation, by using a single-reactor or multiple-reactor stirring type polymerization apparatus, tube type polymerization apparatus, or the like.

The radical polymerization initiator is preferably an initiator of which the temperature at which the half life is 10 hours, is 0 to 100° C., more preferably from 20 to 90° C. For example, an azo compound such as azo bis isobutyronitrile; a peroxydicarbonate such as diisopropyl peroxydicarbonate; a peroxyester such as tert-butyl peroxypivalate, tert-butyl peroxyisobutylate or tert-butyl peroxyacetate; a non-fluorine type diacyl peroxide such as isobutyryl peroxide, octanoyl peroxide, benzoyl peroxide or lauroyl peroxide; a fluorinated diacyl peroxide such as (Z(CF$_2$)$_p$COO)$_2$ (wherein Z is a hydrogen atom, a fluorine atom or a chlorine atom, and p is an integer of from 1 to 10); or an inorganic peroxide such as potassium persulfate, sodium persulfate or ammonium persulfate, may be mentioned.

The polymerization medium may, for example, be an organic solvent such as fluorohydrocarbon, chlorohydrocarbon, fluorochlorohydrocarbon, an alcohol or a hydrocarbon, or an aqueous medium.

The chain transfer agent may, for example, be an alcohol such as methanol or ethanol; a chlorofluorohydrocarbon such as 1,3-dichloro-1,1,2,2,3-pentafluoropropane or 1,1-dichloro-1-fluoroethane; or a hydrocarbon such as pentane, hexane or cyclohexane.

The polymerization conditions are not particularly limited, but the polymerization temperature is usually preferably from 0 to 100° C., more preferably from 20 to 90° C. Further, the polymerization pressure is preferably from 0.1 to 10 MPa, more preferably from 0.5 to 3 MPa. The polymerization time may change depending upon the polymerization temperature, the polymerization pressure, etc., but is usually preferably from 1 to 30 hours, more preferably from 2 to 10 hours.

Thermoplastic Resin with Functional Group

The multilayer laminate of the present invention is one containing a laminate (I)/(II) formed by directly bonding a layer (I) made of the above fluororesin (A) with the functional group (a) and a layer (II) made of a thermoplastic resin (B) with a functional group (b) capable of forming a chemical bond by reacting with the functional group of the above fluororesin.

Such a functional group (b) is preferably at least one member selected from the group consisting of an amino group, an isocyanate group, a hydroxyl group, a hydrolyzable silyl group, an epoxy group, an acid anhydride residue, an alkoxy carbonyl group and a carboxyl group.

The thermoplastic resin (B) in the present invention is not particularly limited, but may preferably be the following thermoplastic resin taking into consideration e.g. a case where the laminate of the present invention is used for the application to a tube, a belt or the like in which the flexibility is required. Further, in the present invention, the thermoplastic resin (B) is used as meaning to include not only a usual thermoplastic resin but also a thermoplastic elastomer.

Namely, the usual thermoplastic resin may, for example, be an olefin resin such as polyethylene (high density polyethylene, middle density polyethylene, low density polyethylene or ultralow density polyethylene), polypropylene, polybutene, polybutadiene or an α-olefin-ethylene copolymer; a polyester resin such as polybutylene terephthalate, polyethylene terephthalate, polyethylene isophthalate or polyethylene naphthalate; a polyurethane resin such as a thermoplastic polyurethane; a polyvinyl acetate resin such as polyvinyl acetate or ethylene/vinyl acetate; a polyvinyl alcohol resin such as polyvinyl alcohol or a vinyl alcohol/ethylene copolymer; a polyvinyl chloride resin such as polyvinyl chloride, polyvinylidene chloride or a vinyl chloride/vinylidene chloride copolymer; a poly(meth)acrylate resin such as polymethyl acrylate, polyethyl acrylate, polymethyl methacrylate or polyethyl methacrylate; a polystyrene resin such as polystyrene or poly α-methylstyrene; a polynitrile resin such as polyacrylonitrile, polymethacrylonitrile, an acrylonitrile/styrene copolymer, a methacrylonitrile/styrene copolymer or a methacrylonitrile/styrene/butadiene copolymer, a polyamide resin such as nylon 11, nylon 12, nylon 610, nylon 612, nylon 66 or nylon 46; a polyimide resin such as polyimide, polycarbonate, polyether ether ketone, polyether imide, polyether ketone, polyether sulfone, polythioether sulfone, polyether nitrile or polyphenylene ether.

Further, the thermoplastic elastomer may, for example, be a polyurethane thermoplastic elastomer such as a polyether type or a polyester type; a polyolefin thermoplastic elastomer such as an ethylene/propylene copolymer or an ethylene/propylene/diene copolymer; a polyester thermoplastic elastomer; a polystyrene thermoplastic elastomer such as a styrene/ethylene/butylene block copolymer, a styrene/ethylene/propylene block copolymer or a styrene/isoprene copolymer; or a polyamide thermoplastic elastomer.

Among the above thermoplastic resins, particularly preferred are a polyurethane thermoplastic resin or a thermoplastic elastomer, a polyester thermoplastic resin or a thermoplastic elastomer, and a polyolefin thermoplastic resin or a thermoplastic elastomer.

Further, in a case where the laminate of the present invention is used for an application in which the flexibility is particularly required, the above thermoplastic resin (B) has a flexibility of preferably at most 85, more preferably at most 80, as defined by Shore A hardness. The Shore A hardness is a hardness measured by ASTM D-2240.

Further, as the thermoplastic resin (B) in the present invention, it is preferred to select one having a low melting point such as a relatively low melting point of from 120 to 230° C., preferably from 140 to 200° C. Further, in a case of the thermoplastic resin (B) of which the melting point is unclear, the flow starting temperature as a substitute for the melting point is preferably within such a range. Here, the flow starting temperature is measured in such a manner that an orifice having a diameter of 2.1 mm and a length of 8 mm is set in a flow tester manufactured by Shimadzu Corporation, then a thermoplastic resin as an object is filled therein, the thermoplastic resin is heated under a load of 7 kg, followed by measuring a temperature at which the thermoplastic resin starts to flow out from the orifice.

Introducing of Functional Group (b)

In the present invention, a preferred method for introducing a functional group to the above thermoplastic resin may, for example, be a method of copolymerizing a monomer with a functional group (b) at the time of producing the thermoplastic resin; a method of graft polymerizing a monomer with the functional group (b) at the time of producing the thermoplastic resin; a method of introducing the functional group (b) to polymer chain terminals of the thermoplastic resin by using an initiator or a chain transfer agent having the functional group (b) at the time of polymerization; a method of introducing the functional group (b) to polymer chain terminals by chain-extending a prepolymer of the thermoplastic resin by a compound with the functional group (b); or a method of introducing the functional group (b) to a thermoplastic resin by melt-kneading the thermoplastic resin and a compound with the functional group (b).

According to a study by the present inventors, the easiest method is the method of adding the compound with the functional group (b) to the thermoplastic resin, followed by melt-kneading, and it is possible to obtain a sufficient effect by such a method. The amount of the compound with the functional group (b) to be added thereto is usually from 0.1 to 10 mass %, preferably from 0.3 to 8 mass %, most preferably from 0.5 to 5 mass %, based on the functional group to the thermoplastic resin, though the amount may be changed depending upon the type of the functional group.

The compound with the functional group (b) is not particularly limited so long as it is a compound with the functional group and having excellent affinity with the thermoplastic resin, and an optional one may be used.

For example, the compound with an amino group may be N-(2-aminoethyl)-3-aminopropyl trimethoxysilane, N-(2-aminoethyl)-3-aminopropyl triethoxysilane, 3-aminopropyl trimethoxysilane, 3-aminopropyl triethoxysilane, N-(2-aminoethyl)-3-aminopropylmethyl dimethoxysilane, (aminoethyl aminomethyl)phenethyl trimethoxysilane, (aminoethyl aminomethyl)phenethyl triethoxysilane, N-(2-aminoethyl)-3-aminopropyltris(2-ethylhexoxy)silane, 6-(aminohexyl aminopropyl)trimethoxysilane, 4-aminobutyl trimethoxysilane, 4-aminobutyl triethoxysilane, p-aminophenyl trimethoxysilane, 3-(1-aminopropoxy)-3,3-dimethyl-1-propenyl trimethoxysilane, 3-aminopropyltris(methoxy ethoxy ethoxy)silane, 3-aminopropylmethyl diethoxysilane or aminoundecyl trimethoxysilane, a $C_{1-20}$ alkylene diamine such as ethylene diamine or hexamethylene diamine, or aminopropyl vinyl ether.

The compound with an isocyanate group may be 3-isocyanate propyl triethoxysilane, or a diisocyanate such as tolylene diisocyanate or diphenylmethane diisocyanate.

The compound with a hydroxyl group may be an ethylene glycol, a diol such as polyoxyethylene diol or polyoxypropylene diol, a polyol or a hydroxybutyl vinyl ether.

The compound with a hydrolyzable silyl group may be a silane coupling agent such as 3-chloropropyl trimethoxysilane or vinyl trimethoxysilane.

The compound with an epoxy group may be 2-(3,4-epoxycyclohexyl)ethyl trimethoxysilane, 3-glycidoxypropyl trimethoxysilane, 3-glycidoxypropylmethyl diethoxysilane, 3-gycidoxypropyl triethoxysilane or glycidyl vinyl ether.

The compound with an acid anhydride may, for example, be a carboxylic anhydride such as acetic anhydride, an aromatic acid anhydride such as pyromellitic anhydride, phthalic anhydride, or an acid anhydride monomer such as maleic anhydride, itaconic anhydride or citraconic anhydride.

Further, the functional group contained in the thermoplastic resin itself may be selected for use, and an amino group or a carboxyl group in a polyimide resin, an alkoxy carbonyl group in a vinyl acetate resin, a hydroxyl group in a polyvinyl alcohol or polyurethane, or a carboxyl group, an epoxy group or a hydroxyl group in a poly(meth)acrylate resin, may, for example, be mentioned.

Combination of Functional Groups (a) and (b)

In the present invention, as a specific combination of the functional group (a) and the functional group (b), the following may, for example, be mentioned as a preferred example.

(i) A combination in which the functional group (a) is an acid anhydride residue, a carboxyl group, an epoxy group or an acid halide group and the functional group (b) is an amino group;

(ii) a combination in which the functional group (a) is an acid anhydride residue, a carboxyl group or a hydroxyl group and the functional group (b) is an isocyanate group;

(iii) a combination in which the functional group (a) is an acid anhydride residue, a carboxyl group, a hydroxyl group or a hydrolyzable silyl group and the functional group (b) is a hydroxyl group;

(iv) a combination in which the functional group (a) is a hydroxyl group or a hydrolyzable silyl group and the functional group (b) is a hydrolyzable silyl group;

(v) a combination in which the functional group (a) is an acid anhydride residue or a carboxyl group and the functional group (b) is an epoxy group;

(vi) a combination in which the functional group (a) is a hydroxyl group or an epoxy group and the functional group (b) is an acid anhydride residue or a carboxyl group; or (vii) a combination in which the functional group (a) is an alkoxy carbonyl group and the functional group (b) is an alkoxy carbonyl group, may, for example, be a preferred combination.

Further, a more preferred specific combination is as follows.

(a) An acid anhydride residue/(b) an amino group,
(a) an acid anhydride residue/(b) an epoxy group,
(a) an epoxy group/(b) an amino group,
(a) a hydrolyzable silyl group/(b) a hydrolyzable silyl group, or
(a) an acid halide group/(b) an amino group.

Further, the most preferred specific combination is (a) an acid anhydride residue/(b) an amino group.

Laminate

The present invention provides a multilayer laminate containing a laminate (I)/(II) formed by directly bonding a layer (I) made of a fluororesin (A) with the above functional group (a) and a layer (II) made of a thermoplastic resin (B) with a functional group (b) capable of forming a chemical bond by reacting with the above functional group (a) of the fluororesin, particularly preferably one obtained by bonding them under heating, namely one obtained by thermally laminating them.

Particularly when formed by the thermal lamination, the laminate [(I)/(II)] becomes an extremely strongly bonded laminate. It is assumed that the functional group (a) such as an acid anhydride residue in the fluororesin (A) to form the layer (I) and the functional group (b) such as amino group or an epoxy group in the thermoplastic resin (B) to form the layer (II) are reacted and bonded in the lamination interface by lamination under heating, whereby the layer (I) of the fluororesin (A) and the layer (II) of the thermoplastic resin (B) are strongly bonded.

Further, in the laminate [(I)/(II)], particularly the layer (II) made of the thermoplastic resin (B) has a functional group (b) such as an amino group or an epoxy group, whereby the laminate has good bonding properties with many other resins, particularly with a thermoplastic resin. Accordingly, by thermally laminating the layer (II) as an adhesive layer and another layer (III) thereon, both layers are strongly bonded to each other, and it is possible to form a multilayer laminate [(I)/(II)/(III)] of the three layers with strong interlayer bonding. Further, similarly, it is also possible to form a multilayer laminate [(I)/(II)/(III)/(IV)], [(I)/(II)/(III)/(IV)/(V)] . . . etc., having four or more layers including the laminate [(I)/(II)] of the present invention. Thus, by laminating a desired thermoplastic resin using the laminate [(I)/(II)] as a base, it is possible to readily form a multilayer laminate excellent in mechanical strength or chemical barrier properties at a low cost.

The resin which may be suitably laminated on the side of [(II)] of the laminate [(I)/(II)] of the present invention, to form a laminate [(I)/(II)/(III)/(IV)/(V) . . . ] having at least three layers, is not particularly limited so long as it is a thermoplastic resin, and an optional one may be selected for use depending upon the particular purpose. It may, for example, be a simple substance or mixture of polyethylene (high density polyethylene, medium density polyethylene, low density polyethylene, ultralow density polyethylene), polypropylene, polybutene, polybutadiene, an ABS resin, polystyrene, a methacryl resin, a norbornene resin, polyvinyl chloride, polyvinylidene chloride, a polyester such as polybutylene terephthalate, polyethylene terephthalate or polyethylene naphthalate, polycarbonate, polyamide, polyimide, a thermoplastic polyimide, polyaminobismaleimide, polysulfone, polyphenylene sulfide, polyether ether ketone, polyether imide, polyether ketone, polyether sulfone, polythioether sulfone, polyether nitrile, or polyphenylene ether, or a mixture of such a simple substance or mixture thereof, as a matrix, with carbon black, various elastomer components, a glass fiber or a carbon fiber. Such resins may be laminated as layers (III), (IV), (V) . . . , to provide a multilayer laminate.

The thickness as a whole of the multilayer laminate of the present invention may optionally be set depending upon the particular purpose, but is usually preferably from 10 µm to 2 cm, more preferably from 50 µm to 1 cm.

Further, the thickness of the layer (I) made of the fluororesin (A) with the functional group (a) is preferably from 5 μm to 5,000 μm, more preferably from 50 μm to 500 μm, and the thickness of the layer (II) made of the thermoplastic resin (B) with the functional group (b) is preferably from 5 μm to 1.5 cm, more preferably from 50 μm to 1 cm.

The multilayer laminate of the present invention is one containing a laminate having excellent adhesion is between the fluororesin layer (I) and the thermoplastic resin layer (II), and it is possible to form the multilayer laminate into various shapes such as a film, a sheet, a tube, a hose, a tank and a bottle. Particularly, by optionally selecting and using a thermoplastic resin, it is possible to obtain a multilayer laminate suitable for industrial tubes or industrial belts in which the flexibility is required.

Formation of Laminate

As a method for obtaining the laminate [(I)/(II)] or the multilayer laminate such as [(I)/(II)/(III)] including the laminate of the present invention, from the viewpoint of easiness of molding and productivity, it is possible to suitably apply a method including thermal lamination such as multilayer extrusion (co-extrusion), extrusion lamination, lamination molding using heat rolls or heat press, multilayer injection molding or multilayer blow molding. It is more preferably a co-extrusion method. For example, in the case of the co-extrusion, the fluororesin and the thermoplastic resin are extruded from outlets of different extruders, and then passed through a die while contacting them in a molten state, whereby the fluororesin and the thermoplastic resin are directly laminated to obtain a laminate thereof.

Further, firstly, [(I)/(II)] may be formed by multilayer extrusion or extrusion lamination, and then e.g. third layer (III) may be heat-pressed thereon to is form a multilayer laminate [(I)/(II)/(III)], or the multilayer laminate including the laminate [(I)/(II)] may be formed by a single step by means of e.g. multilayer extrusion or multilayer lamination.

The present invention is based on the thermal lamination of the layer (I) and the layer (II), and the lamination temperature is from 140 to 280° C., more preferably from 150 to 250° C. If the temperature is lower than 140° C., the development of adhesion based on the reaction of the functional groups (a) and (b) will be insufficient. If the temperature is higher than 280° C., particularly, the thermal decomposition or modification of the thermoplastic resin, the discoloration of the resin, or the like may no longer be negligible.

In a case of forming a multilayer laminate by a melt-multilayer extrusion, a melt-kneading and injecting temperature is from 150 to 300° C., preferably from 150 to 280° C., more preferably from 150 to 250° C. If it exceeds 300° C., the thermal decomposition or thermal modification of the thermoplastic resin, the discoloration of the resin, or the like, will no longer be negligible, such being undesirable. If it is lower than 150° C., the development of adhesion based on the reaction of the functional groups (a) and (b) will be insufficient.

The interlayer adhesion between the fluororesin layer (I) and the thermoplastic resin layer (II) in the laminate [(I)/(II)] of the present invention is preferably from 5 to 30 N/cm, more preferably from 15 to 25 N/cm. When the interlayer adhesion is within a range of from 5 to 30 N/cm, the laminate is not susceptible to interlayer peeling at the time of flexure, and the transparency is not deteriorated by whitening.

EXAMPLES

Now, the present invention will be described in detail with reference to Examples, but it should be understood that the present invention is not limited thereto.

Resin Used and Various Evaluation Methods (i) Fluororesin

As a fluororesin with no functional group, an ethylene/tetrafluoroethylene copolymer (hereinafter sometimes referred to as "ETFE fluororesin") (LM-730 manufactured by Asahi Glass Company, Limited; melting point: 225° C., volume flow rate at 297° C.: 31 mm$^3$/sec) was used.

(ii) Thermoplastic Polyurethane

Thermoplastic polyurethane elastomers (MP-10 (a polyester thermoplastic polyurethane elastomer; Shore A hardness 77) and P-602 (polyether thermoplastic polyurethane elastomer; Shore A hardness 75), manufactured by Asahi Glass Company, Limited) were used.

(iii) Silane Coupling Agent with Amino Group

N-(2-aminoethyl)-3-aminopropyl trimethoxysilane (KBM-603, manufactured by Shin-Etsu Chemical Co., Ltd.) (hereinafter referred to as "KBM-603") was used.

(iv) Volume Flow Rate: Value Q (mm$^3$/sec)

The value Q is an extrusion rate of a fluororesin at the time when it is extruded from an orifice having a diameter of 2.1 mm and a length of 8 mm under a load of 7 kg at a temperature higher by 50° C. than the melting point of the fluororesin, by using a Flow tester manufactured by Shimadzu Corporation. Further, in Examples in the present invention, the measuring temperature was 220° C.

(v) Melting Point (° C.)

It was obtained from an endothermic peak at the time of heating to 300° C. at 10° C./min in the air atmosphere by using a scanning differential thermal analyzer (DSC220CU, manufactured by Seiko Instruments Inc.).

(vi) Shore A Hardness

In accordance with ASTM D-2240 and by using a digi test manufactured by Bareiss, measurement was carried out by laminating three sheets each obtained by pressing e.g. a thermoplastic resin into a thickness of 2 mm and an area of 10 cm$^2$. The measurement was carried out at three points and an average value was calculated.

(vii) Content of Acid Anhydride Residue (mol %)

By using a film having a thickness of 200 μm obtained by press-molding a fluororesin, the intensity of absorption derived from an acid anhydride residue, which appears in the vicinity of 1,870 cm$^{-1}$ was measured by a Fourier transformation infrared spectrometer (AVATAR 360, manufactured by Nicolet). By using a molar absorption coefficient (itaconic anhydride: 237 L/mol·cm) of an acid anhydride residue identified from a model compound, the content of the acid anhydride residue was calculated.

(viii) Composition of Fluororesin (mol %)

It was calculated from results of measurement of the total amount of fluorine and melt $^{19}$F-NMR measurement.

(ix) Interlayer Adhesion (N/cm)

A fluororesin film having a thickness of 100 μm and a thermoplastic resin film having a thickness of 200 μm obtainable by press-molding, were laminated and melt-bonded for 30 seconds at a heating level 7 (270° C.) by using a heat sealer (manufactured by FUJIIMPULSE CO., LTD.), and then a film obtained was taken out. Such a laminate film obtained was cut into a strip shape having a length of 5 cm and a width of 1 cm to prepare a test piece. By using a tensile tester, the peel strength of the test piece was measured and regarded as interlayer adhesion.

(x) MIT Flex Test (Number of Times)

It was measured in accordance with ASTM D-2176. Namely, a fluororesin was press-molded into a sheet having a thickness of 0.23 mm, a strip sample having a width of 12.5 mm and a length of 130 mm was cut out, and a flex test was carried out under conditions of an angle of ±135°, 175 times/min and a load of 1.25 kg by using an MIT bending test apparatus manufactured by Toyo Seiki Seisaku-Sho, Ltd. to measure the number of times until the sample ruptured.

(xi) Tensile Strength (MPa)

It was measured in accordance with ASTM D-3159. Namely, a test piece having a thickness of 1 mm obtained by heat press molding was tested by a Tensilon tensile tester manufactured by A&D Co., LTD. at a tensile speed of 200 mm/min, and the stress at the time when the test piece ruptured, was measured.

Preparation Example 1

Preparation of Fluororesin (A) Containing an Acid Anhydride Residue (1) A polymerization reactor equipped with a stirrer having an internal volume of 1.3 L was deaerated, and 671.1 g of 1-hydrotridecafluorohexane, 167.8 g of 1,3-dichloro-1,1,2,2,3-pentafluoropropane (AK225cb, manufactured by Asahi Glass Company, Limited, hereinafter referred to as "AK225cb") and 3.33 g of $CH_2=CH(CF_2)_4F$ were charged, 352 g of HFP, 110.5 g of TFE and 3.5 g of E were injected thereto, and the temperature in the polymerization reactor was increased to 66° C. 6.7 mL of a 5 mass % 1-hydrotridecafluorohexane solution of tert-butyl peroxypivalate as a polymerization initiator was charged to initiate the polymerization. A monomer mixed gas having a composition of TFE/E=54/46 (molar ratio) was continuously charged so that the pressure would be constant during the polymerization, and $CH_2=CH(CF_2)_4F$ and a 1 mass % AK225cb solution of itaconic anhydride were continuously charged so as to be 1.0 mol % and 0.25 mol %, respectively, to the monomer mixed gas of TFE/E. 3.6 hours after initiation of the polymerization, when 70 g of the monomer mixed gas was charged, the temperature in the interior of the polymerization reactor was lowered to room temperature and at the same time, unreacted monomers were purged until the pressure reached atmospheric pressure.

(2) A fluororesin in a slurry form obtained was subjected to suction filtration by a glass filter, and the fluororesin was dried at 120° C. for 15 hours to obtain 78 g of a fluororesin (hereinafter referred to as "fluororesin (A)-1")

The melting point of the fluororesin (A)-1 was 175° C., the value Q was 12 mm³/sec, and the copolymerization composition was such that the repeating units based on TFE/repeating units based on E/repeating units based on HFP/repeating units based on $CH_2=CH(CF_2)_4F$/repeating units based on itaconic anhydride=48.1/42.7/8.2/0.8/0.2 (mol %).

The fluororesin (A)-1 had MIT of 39,200 and a tensile strength of 48 MPa.

Preparation Example 2

Preparation of Thermoplastic Polyurethane (B) Having an Amino Group

In a laboplastomill (manufactured by Toyo Seiki Seisaku-Sho, Ltd.), the above thermoplastic polyurethane (MP-10 and P-602) and a silane coupling agent (KBM-603) were melt-kneaded at the proportion and temperature shown in Table 1, and an amino group was introduced into the thermoplastic polyurethane to obtain four types of amino group-introduced thermoplastic polyurethane samples (thermoplastic resin (B)-1 to thermoplastic resin (B)-4).

TABLE 1

| Sample | Type of polyurethane | Polyurethane (g) | KBM-603 (g) | Temperature (° C.) | Kneading time (min) | Shore A hardness |
|---|---|---|---|---|---|---|
| Thermoplastic resin (B)-1 | MP-10 | 27 | 0.84 | 150 | 2 | 66 |
| Thermoplastic resin (B)-2 | P-602 | 27 | 0.84 | 150 | 2 | 64 |
| Thermoplastic resin (B)-3 | P-602 | 27 | 0.54 | 150 | 4 | 68 |
| Thermoplastic resin (B)-4 | P-602 | 27 | 0.18 | 150 | 4 | 73 |

Example 1

The fluororesin (A)-1 with an acid anhydride group was press-molded to prepare a fluororesin film having a thickness of 100 μm (hereinafter referred to as "fluororesin film-1"). Further, an amino group-introduced thermoplastic resin (B)-1 was similarly press-molded to obtain a film of the thermoplastic resin (B)-1 having a thickness of 200 μm (hereinafter referred to as "thermoplastic resin film-1").

Such a fluororesin film-1 and thermoplastic resin film-1 were laminated and melt-bonded at a heating level 7 by using a heat sealer (manufactured by FUJIIMPULSE CO., LTD.) to obtain a laminate film. The interlayer adhesion of the laminate film was measured, and the results are shown in Table 2. The interlayer adhesion was found to be sufficiently high.

TABLE 2

|  | Fluororesin | Thermoplastic resin | Interlayer adhesion (N/cm) |
|---|---|---|---|
| Ex. 1 | Fluororesin (A)-1 | Thermoplastic resin (B)-1 | 15 |
| Ex. 2 | Fluororesin (A)-1 | Thermoplastic resin (B)-2 | 16 |
| Ex. 3 | Fluororesin (A)-1 | Thermoplastic resin (B)-3 | 17 |
| Ex. 4 | Fluororesin (A)-1 | Thermoplastic resin (B)-4 | 16 |
| Comp. Ex. 1 | Fluororesin (A)-1 | MP-10 | <2.0 |
| Comp. | Fluororesin | P-602 | <2.0 |

TABLE 2-continued

|  | Fluororesin | Thermoplastic resin | Interlayer adhesion (N/cm) |
|---|---|---|---|
| Ex. 2 | (A)-1 | | |
| Comp. Ex. 3 | LM-730 | Thermoplastic resin (B)-4 | <2.0 |

Example 2

A laminate film was obtained by carrying out the same treatment as in Example 1 except that the thermoplastic resin (B)-2 was used instead of the thermoplastic resin (B)-1 as a thermoplastic resin. The interlayer adhesion of the film was shown in Table 2.

Example 3

A laminate film was obtained by carrying out the same treatment as in Example 1 except that the thermoplastic resin (B)-3 was used instead of the thermoplastic resin (B)-1 as a thermoplastic resin. The interlayer adhesion of the film was shown in Table 2.

Example 4

A laminate film was obtained by carrying out the same treatment as in Example 1 except that the thermoplastic resin (B)-4 was used instead of the thermoplastic resin (B)-1 as a thermoplastic resin. The interlayer adhesion of the film was shown in Table 2.

Comparative Example 1

A laminate film was obtained by carrying out the same treatment as in Example 1 except that the thermoplastic polyurethane elastomer (MP-10) having no amino group introduced was used instead of the thermoplastic resin (B)-1 as a thermoplastic resin. The interlayer adhesion of the film was shown in Table 2. This interlayer adhesion was found to be very low.

Comparative Example 2

A laminate film was obtained by carrying out the same treatment as in Example 1 except that the thermoplastic polyurethane elastomer (P-602) having no amino group introduced was used instead of the thermoplastic resin (B)-1 as a thermoplastic resin. The interlayer adhesion of the film was shown in Table 2. This interlayer adhesion was found to be very low.

Comparative Example 3

A laminate film was obtained by carrying out the same treatment as in Example 1 except that, as a fluororesin, an ETFE fluororesin (LM-730, manufactured by Asahi Glass Company, Limited) containing no acid anhydride residue, and as a thermoplastic resin, the thermoplastic resin (B)-4 having an amino group introduced, were used. The interlayer adhesion of the film was shown in Table 2. This interlayer adhesion was found to be very low.

INDUSTRIAL APPLICABILITY

The multilayer laminate of the present invention is one containing a laminate excellent in adhesion, which is obtained by laminating and directly bonding a fluororesin layer (I) and a thermoplastic resin layer (II), and it is possible to readily form the multilayer laminate into various shapes such as a film, a sheet, a tube, a hose, a tank and a bottle. Particularly, by selecting a desired flexible resin or an elastomer as a thermoplastic resin to be laminated on the fluororesin, it is possible to use the multilayer laminate suitably in fields for industrial tubes in which flexibility is required, such as an industrial hose for transporting e.g. oils, chemicals, paints, beer, liquor, soy sauce, sauce, drinking water, coffee, tea, milk, fermented lactic-drink, fruit juice, syrup, yogurt, paste foods such as mayonnaise or miso, a fuel transportation hose for e.g. gas, light oil or alcohol; a water supply hose, a medical tube to supply infusion, chemicals or blood supply; an industrial belt, a moving part for robot arms, a tube for e.g. air, oil or cooling water, a tube for transporting ink for a large-sized inkjet printer, an outer layer material for pipes of an open-air bath or pipes for protecting outside high-voltage cables or a tube for semiconductor manufacturing. Further, it is also possible to suitably use it as a film such as a waterproof sheet, a film for laminating glass or a solar battery protection film. Further, it is also possible to suitably use it in a field of coating materials such as a coating material for a wire for suspension bridges or a coating material for a metal pipe for automobiles.

The entire disclosure of Japanese Patent Application No. 2005-173223 filed on Jun. 14, 2005 including specification, claims and summary is incorporated herein by reference in its entirety.

What is claimed is:

1. A multilayer laminate containing a laminate (I)(II) that is formed by directly bonding a layer (I) made of a fluororesin (A) having a functional group (a), said fluororesin (A) being an ethylene/tetrafluoroethylene/hexafluoropropylene/$CH_2$=CH—Rf copolymer, wherein Rf is a $C_{2-6}$ perfluoroalkyl group, and in the copolymer, the molar ratio of repeating units based on ethylene/repeating units based on tetrafluoroethylene/repeating units based on hexafluoropropylene/repeating units based on $CH_2$=CH—Rf ranges from 40/47/10/3 to 46.9/46.9/6/0.2 and a layer (II) made of a thermoplastic resin (B) having a functional group (b) that is capable of forming a chemical bond by reacting with the functional group (a) of the fluororesin, wherein the fluororesin (A) has a melting point ranging from 120 to 230° C.

2. The multilayer laminate according to claim 1, wherein the functional group (a) of the fluororesin (A) is an acid anhydride residue.

3. The multilayer laminate according to claim 1, wherein the functional group (b) of the thermoplastic resin (B) is an amino group.

4. The multilayer laminate according to claim 1, wherein the thermoplastic resin (B) is at least one thermoplastic resin or elastomer selected from the group consisting of polyurethane, polyester, polyolefin, polyvinyl acetate, polyvinyl chloride and polystyrene thermoplastic resins.

5. The multilayer laminate according to claim 1, wherein the thermoplastic resin (B) has a Shore A hardness of at most 85.

6. The multilayer laminate according to claim 1, wherein the fluororesin (A) has an MIT flex number of 20,000 to 100,000 as measured by ASTM D-2176.

7. The multilayer laminate according to claim 1, wherein the fluororesin (A) has a tensile strength ranging from 35 to 60 MPa as measured by ASTM D-3159.

8. The multilayer laminate according to claim 1, wherein the above multilayer laminate is bonded under heating, by multilayer extrusion, by multilayer injection molding or by multilayer laminate molding.

9. The multilayer laminate according to claim 1, which is bonded under heating at a temperature ranging from 150 to 300° C.

10. The multilayer laminate according to claim 1, wherein the interlayer adhesion between the layer (I) made of the fluororesin (A) and the layer (II) made of the thermoplastic resin (B) ranges from 5 to 30 N/cm.

11. The multilayer laminate according to claim 1, wherein the molar ratios of repeating units of fluororesin (A) range from 42/47/9/2 to 46/47/6.5/0.5.

12. The multilayer laminate according to claim 1, wherein the functional group (a) of the fluororesin (A) is a member selected from the group consisting of acid anhydride, carboxyl, hydroxyl, epoxy, hydrolysable silyl, alkoxy carbonyl, and acid halide.

13. The multilayer laminate according to claim 1, wherein the functional group (b) of the thermoplastic resin (B) is a member selected from the group consisting of amino, isocyanate, hydroxyl, hydrolysable silyl, epoxy, acid anhydride, alkoxy carbonyl and acid halide.

* * * * *